US012775383B1

(12) United States Patent
Shechter

(10) Patent No.: US 12,775,383 B1
(45) Date of Patent: Oct. 27, 2026

(54) SYSTEM AND METHOD OF MANAGING ACCESS TO A MEMORY DEVICE

(71) Applicant: NEXT SILICON LTD., Givatayim (IL)

(72) Inventor: Dan Shechter, Berlin (DE)

(73) Assignee: NEXT SILICON LTD., Givatayim (IL)

( * ) Notice: Subject to any disclaimer, the term of this patent is extended or adjusted under 35 U.S.C. 154(b) by 0 days.

(21) Appl. No.: 19/569,021

(22) Filed: Mar. 17, 2026

(51) Int. Cl.
*G06F 3/06* (2006.01)

(52) U.S. Cl.
CPC .......... *G06F 3/0611* (2013.01); *G06F 3/0659* (2013.01); *G06F 3/0679* (2013.01)

(58) Field of Classification Search
CPC .... G06F 3/0611; G06F 3/0659; G06F 3/0679; G06F 3/0613; G06F 13/161; G06F 13/1626; G06F 13/1642; G06F 13/32; G06F 13/28; G06F 13/285; G06F 13/30
See application file for complete search history.

(56) References Cited

U.S. PATENT DOCUMENTS 7,194,561 B2 * 3/2007 Weber .................... G06F 13/161 710/316
11,875,153 B1 1/2024 Raz et al.
2024/0281141 A1 * 8/2024 La Fratta .............. G06F 3/0679

* cited by examiner

*Primary Examiner* — Idriss N Alrobaye
*Assistant Examiner* — Richard B Franklin
(74) *Attorney, Agent, or Firm* — The Roy Gross Law Firm, LLC; Roy Gross

(57) ABSTRACT

A method of managing access to a memory device by a dataflow computing device may include maintaining a globally synchronized clock signal across PE clusters of the dataflow computing device, and determining a current phase of a memory access cycle based on a count of global clock cycles. The memory access cycle may include at least a read phase and a write phase. During the read phase, PE clusters handling threads with pending memory write operations may block those threads to postpone write execution. During the write phase, PE clusters handling threads with pending memory read operations block those threads to postpone read execution. Embodiments may thereby generate strings of consecutive read operations and consecutive write operations for accessing the memory device, thereby mitigating read/write switching penalties without additional hardware overhead.

20 Claims, 6 Drawing Sheets

SYSTEM AND METHOD OF MANAGING ACCESS TO A MEMORY DEVICE

FIELD OF INVENTION

The present invention relates to memory system efficiency and performance in dataflow computing environments, and more particularly to a system and method of managing access to a memory device by a dataflow computing device.

BACKGROUND

Modern memory systems, such as Dynamic Random Access Memory (DRAM) based systems, suffer from a notorious problem referred to as read-to-write or write-to-read penalty: Efficiency of memory controllers is substantially diminished when forced to repeatedly switch between read mode and write mode. While controllers attempt to mitigate the problem, they normally lack the capacity for generating sufficiently long strings of read and write operations to avoid the problem completely: Reorder queues are often limited to tens of entries, limiting performance to 65%-75% of DRAM theoretical speed due to this switching. Experimental results show that strings of consecutive memory access operations of the same type (read or write) that are larger by at least one order of magnitude are typically required to attain adequate (e.g., greater than 95%) performance.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

Embodiments of the present invention may provide several benefits over conventional approaches to managing memory access in computing systems.

Embodiments of the present invention may provide means, in a dataflow environment, to circumvent the problem by creating longer strings of reads and writes at a lower hardware cost. The combination of per-port staging elements, globally synchronized clock, and telemetry-driven configuration may provide a mechanism similar to a reordering queue, without paying additional buffering space or having to perform expensive address checks in existing reorder queues.

Other known solutions utilize a cascade of reordering queues, where a first queue is dedicated for the purpose of grouping read and write operations, and a subsequent, "regular" reorder queue, which is more limited in capacity since it may have additional responsibilities. The disadvantages of such approaches are that grouping costs silicon and is limited in its scope. Moreover, since such a read/write grouping queue does not have context of dataflow computing, the read/write grouping queue needs to ensure that it does not allow read for specific addresses which are already buffered in a write queue to overtake the pending writes. Without the dataflow context, the only way to implement this is to compare each incoming address from one group to all of the current existing addresses in the other group to avoid these hazards.

Embodiments of the present invention may take a different approach by grouping transactions from different threads, which according to a Data Race Free (DRF) memory model, are already guaranteed not overlap with addresses generated in a different thread in the same dataflow program. The proposed solution may allow creation of longer strings at a lower silicon footprint, using less buffering space, and refraining from comparing addresses of incoming memory access requests to buffered addresses, thereby further conserving computational resources.

According to an aspect of embodiments of the invention, a method of managing access to a memory device by a dataflow computing device is provided.

The dataflow computing device may be adapted to handle computing threads via associated clusters of interconnected processing elements (PEs).

Embodiments of the method may include maintaining a globally synchronized clock signal across the clusters of PEs, and determining a current phase of a memory access cycle based on a count of cycles of the global clock signal. The memory access cycle may include at least a read phase and a write phase. During the read phase, embodiments may control PE clusters handling computing threads that include a pending memory write operation to block those computing threads, so as to postpone execution of the pending memory write operation. In a complementary manner, embodiments may include, during the write phase, controlling PE clusters handling computing threads that include a pending memory read operation to block those computing threads, so as to postpone execution of the pending memory read operation. Embodiments of the method may thus generate strings of consecutive read operations and strings of consecutive write operations for accessing the memory device, without need of additional buffering hardware.

According to some embodiments of the invention, at least one PE cluster may implement one or more computing blocks configured as ports to perform memory access operations of the associated thread on the memory device. Additionally, or alternatively, at least one PE cluster may implement one or more staging elements, where each staging element is dedicated to a corresponding port and configured to control execution of a memory access operation by that port based on a current phase of the memory access cycle.

As explained herein, embodiments of the invention may include attributing an access identifier value to one or more staging elements. The access identifier value may, for example, be selected from a read type and a write type. Staging elements attributed the read type may be configured to activate corresponding ports to perform memory read operations during the read phase. Staging elements of the write type may be configured to activate corresponding ports to perform memory write operations during the write phase.

According to some embodiments, attributing the access identifier value may include attributing the write type to staging elements that correspond to computing blocks configured as ports performing a memory write operation and that precede, along the thread, computing blocks configured as ports performing a memory read operation. In a complementary manner, attributing the access identifier value may include attributing the read type to staging elements that correspond to computing blocks configured as ports performing a memory read operation and that precede, along the thread, computing blocks configured as ports performing a memory write operation.

Additionally or alternatively, attributing the access identifier value may include attributing the write type to staging elements that correspond to first computing blocks along the thread in a series of computing blocks configured as ports that perform memory write operations. In a complementary manner, attributing the access identifier value may include attributing the read type to staging elements that correspond to first computing blocks along the thread in a series of computing blocks configured as ports that perform memory read operations.

According to some embodiments, the dataflow computing device may be configured to operate under a data-race-free (DRF) memory model, thereby guaranteeing that addresses of memory access operations of a first computing thread do not overlap addresses of memory access operations generated by a second computing thread handled by the dataflow computing device. As explained herein, a synergy between a work mode based on the DRF memory model and execution over dataflow architecture may allow grouping of memory access operations from different threads without the hardware overhead of additional buffering or logic overhead of comparing addresses, thereby enabling generation of longer strings of consecutive read and write operations at lower hardware and computational cost.

Embodiments of the method may further include monitoring attempted memory access operations by ports of the PE clusters. Based on this monitoring, embodiments may accumulate memory access metadata pertaining to the attempted memory access operations, and dynamically calculating a duty cycle between the read phase and the write phase based on the memory access metadata.

This duty cycle may define a ratio between a count of cycles of the global clock signal allocated to the read phase and a count of cycles of the global clock signal allocated to the write phase. Additionally, or alternatively, the duty cycle may define a portion of duration (e.g., in global clock cycles) of a specific phase (e.g., read or write phase) within the overall duration in the memory access cycle.

Additionally, or alternatively, embodiments of the method may include determining the current phase of the memory access cycle based on the calculated duty cycle.

The memory access metadata may include, for example, a number of attempted memory read operations within a first predetermined timeframe, a number of attempted memory write operations within the first timeframe, and a ratio between attempted memory read operations and attempted memory write operations.

Additionally, or alternatively, the memory access metadata may include, for example: a number of cache hits for memory read operations within a second predetermined timeframe, a number of cache misses for memory read operations within the second timeframe, a number of cache hits for memory write operations within a third predetermined timeframe, and a number of cache misses for memory write operations within the third timeframe.

Additionally, or alternatively, the memory access metadata may include, or represent latency of the memory access operations. Based on the memory access metadata, embodiments of the invention may dynamically calculate an overlap value, defining an intermediate phase between the read phase and the write phase. Embodiments of the invention may thereby determine a value of the current phase of the memory access cycle further based on the overlap value of the intermediate phase (e.g., read phase, write phase or intermediate phase).

During the intermediate phase, PE clusters handling computing threads having a pending memory read operation and PE clusters handling computing threads having a pending memory write operation may not be blocked, and may propagate their respective memory access requests towards the target memory devices.

According to some embodiments, at least one (e.g., each) staging element of a read type may be configured to buffer a plurality of requested memory read operations pertaining to the handled thread, so as to accumulate the memory read operations during a write phase of the memory access cycle. In a complementary manner, at least one (e.g., each) staging element of a write type may be further configured to buffer a plurality of requested memory write operations pertaining to the handled thread, so as to accumulate the memory write operations during a read phase of the memory access cycle.

One or more (e.g., each) staging element may be configured to reorder the buffered memory access operations prior to execution based on one or more optimization criteria. The optimization criteria may include, for example, memory addresses of the buffered operations, expected latency of the buffered operations, memory bank or channel distribution, priority values associated with the buffered operations, temporal locality of the buffered operations, and the like.

According to another aspect of embodiments of the invention, a dataflow computing device is provided. The dataflow computing device may include a plurality of clusters of interconnected processing elements (PEs), adapted to handle computing threads. The dataflow computing device may further include, or be communicatively connected to a clock configured to maintain a globally synchronized clock signal across the clusters of PEs.

The dataflow computing device may determine a memory access cycle based on a count of cycles of the clock signal. This memory access cycle may include at least a read phase and a write phase.

At least one PE cluster of the dataflow computing device may comprise, or implement one or more computing blocks that are configured as ports, to perform memory access operations on a memory device. Additionally, or alternatively, at least one PE cluster may comprise or implement one or more staging elements, where at least one (e.g., each) staging element may be dedicated to a corresponding port and configured to control execution of memory access operations by that port based on a current phase of the memory access cycle.

According to some embodiments of the invention, staging elements dedicated to ports that have a pending memory write operation may be configured to block execution of those memory write operations during a read phase of the memory access cycle. In a complementary manner, staging elements dedicated to ports that have a pending memory read operation may be configured to block execution of those memory read operations during a write phase of the memory access cycle. The dataflow computing device may thereby generate strings of consecutive read operations and strings of consecutive write operations for accessing the memory.

According to some embodiments, the dataflow computing device may further include a controller, configured to monitor attempted memory access operations by ports of the PE clusters. The controller may be configured to accumulate memory access metadata pertaining to the attempted memory access operations, and dynamically calculate a duty cycle between the read phase and the write phase based on the accumulated metadata. The memory access metadata may include, for example, a number of attempted memory read operations within a first predetermined timeframe, a number of attempted memory write operations within the first timeframe, and a ratio between attempted memory read operations and attempted memory write operations. Additionally, or alternatively, the memory access metadata may include, for example, a number of cache hits for memory read operations within a second predetermined timeframe, a number of cache misses for memory read operations within the second timeframe, a number of cache hits for memory write operations within a third predetermined timeframe, and a number of cache misses for memory write operations within the third timeframe. Additionally, or alternatively, the memory access metadata may represent latency of the memory access operations. The controller may thereby dynamically calculate an overlap value based on the latency metadata. The overlap value may define a duration of an intermediate phase between the read phase and the write phase. Staging elements dedicated to ports having a pending memory read operation and staging elements dedicated to ports having a pending memory write operation may be configured not to block those operations during the intermediate phase.

According to another aspect of embodiments of the invention, a system for managing access to a memory device is provided. The system may include a host computing device configured to provide software instructions, and a dataflow computing device connected to the host computing device. The dataflow computing device may include a plurality of clusters of interconnected Processing Elements (PEs), adapted to handle computing threads based on the software instructions received from the host computing device. The dataflow computing device may include a clock configured to maintain a globally synchronized memory access cycle, e.g., common to a plurality of participating computing block clusters). The globally synchronized memory access cycle may include a read phase and a write phase. At least one PE cluster may implement one or more ports configured to perform memory access operations on the memory device. At least one PE cluster may implement one or more staging elements, each dedicated to a corresponding port. As explained herein, the one or more staging elements may be configured to control execution of memory access operations by that port based on a current phase of the globally synchronized memory access cycle.

The foregoing general description of the illustrative embodiments and the following detailed description thereof are merely exemplary aspects of the teachings of this disclosure and are not restrictive.

BRIEF DESCRIPTION OF FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1:
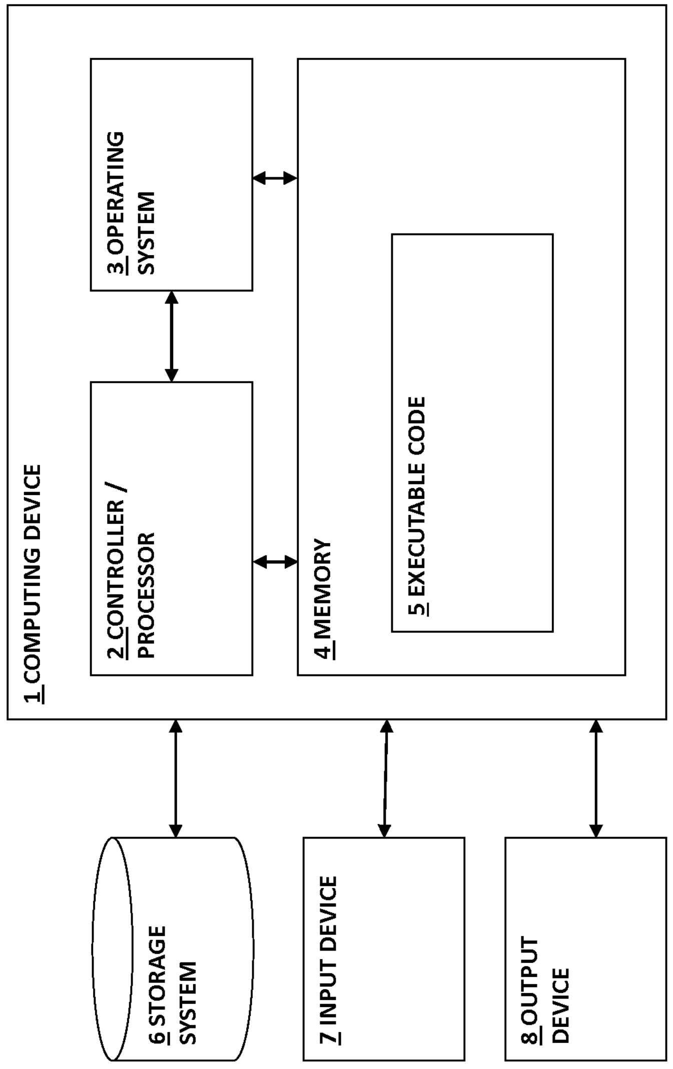
FIG. 1 is a block diagram depicting a computing device, according to some embodiments'

Reference is now made to FIG. 1, which is a block diagram depicting a computing device, which may be included within an embodiment of a system for, according to some embodiments.

Computing device 1 may include a processor or controller 2 that may be, for example, a central processing unit (CPU) processor, a chip or any suitable computing or computational device, an operating system 3, a memory 4, executable code 5, a storage system 6, input devices 7 and output devices 8.

Processor 2 (or one or more controllers or processors, possibly across multiple units or devices) may be configured to carry out methods described herein, and/or to execute or act as the various modules, units, etc. More than one computing device 1 may be included in, and one or more computing devices 1 may act as the components of, a system according to embodiments of the invention.

Operating system 3 may be or may include any code segment (e.g., one similar to executable code 5 described herein) designed and/or configured to perform tasks involving coordination, scheduling, arbitration, supervising, controlling or otherwise managing operation of computing device 1, for example, scheduling execution of software programs or tasks or enabling software programs or other modules or units to communicate. Operating system 3 may be a commercial operating system. It will be noted that an operating system 3 may be an optional component, e.g., in some embodiments, a system may include a computing device that does not require or include an operating system 3.

Memory 4 may be or may include, for example, a Random-Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory, a buffer, a short term memory unit, a long term memory unit, or other suitable memory units or storage units. Memory 4 may be or may include a plurality of possibly different memory units. Memory 4 may be a computer or processor non-transitory readable medium, or a computer non-transitory storage medium, e.g., a RAM. In one embodiment, a non-transitory storage medium such as memory 4, a hard disk drive, another storage device, etc. may store instructions or code which when executed by a processor may cause the processor to carry out methods as described herein.

Executable code 5 may be any executable code, e.g., an application, a program, a process, task, or script. Executable code 5 may be executed by processor or controller 2 possibly under control of operating system 3. For example, executable code 5 may be an application that may as further described herein. Although, for the sake of clarity, a single item of executable code 5 is shown in FIG. 1, a system according to some embodiments of the invention may include a plurality of executable code segments similar to executable code 5 that may be loaded into memory 4 and cause processor 2 to carry out methods described herein.

Storage system 6 may be or may include, for example, a flash memory as known in the art, a memory that is internal to, or embedded in, a micro controller or chip as known in the art, a hard disk drive, a CD-Recordable (CD-R) drive, a Blu-ray disk (BD), a universal serial bus (USB) device or other suitable removable and/or fixed storage unit. in storage system 6 and may be loaded from storage system 6 into memory 4 where it may be processed by processor or controller 2.

In some embodiments, some of the components shown in FIG. 1 may be omitted. For example, memory 4 may be a non-volatile memory having the storage capacity of storage system 6. Accordingly, although shown as a separate component, storage system 6 may be embedded or included in memory 4.

Input devices 7 may be or may include any suitable input devices, components, or systems, e.g., a detachable keyboard or keypad, a mouse and the like. Output devices 8 may include one or more (possibly detachable) displays or monitors, speakers and/or any other suitable output devices. Any applicable input/output (I/O) devices may be connected to Computing device 1 as shown by blocks 7 and 8.

For example, a wired or wireless network interface card (NIC), a universal serial bus (USB) device or external hard drive may be included in input devices 7 and/or output devices 8. It will be recognized that any suitable number of input devices 7 and output device 8 may be operatively connected to Computing device 1 as shown by blocks 7 and 8. A system according to some embodiments of the invention may include components such as, but not limited to, a plurality of central processing units (CPU) or any other suitable multi-purpose or specific processors or controllers (e.g., similar to element 2), a plurality of input units, a plurality of output units, a plurality of memory units, and a plurality of storage units.

As known in the art, a dataflow computing device is a computing architecture in which program execution is driven by the availability of data rather than by a predetermined sequence of instructions. In a dataflow computing device, operations are executed when their input data becomes available, allowing multiple operations to execute in parallel. Computing threads may progress through the dataflow computing device based on data dependencies, with each thread advancing when the data required for its next operation is ready.

As used herein, the term "compilation" may refer to the process of translating software instructions, such as those received from a host computing device, into computing threads that are formatted for execution on a dataflow computing device. The term "projection" may refer to the process of distributing or propagating tokens through data threads, where tokens may represent data values or control signals that flow through the dataflow computing device based on data dependencies. The term "mapping" may refer to the process of assigning or allocating processing elements (PEs) to execute specific operations or portions of computing threads, such that the computational workload is distributed across the available hardware resources. The term "scheduling" may refer to the process of determining the order and timing of thread execution on the dataflow computing device. The term "injecting" may refer to the process of introducing or inserting computing threads into the processing elements for execution.

Figure 2A:
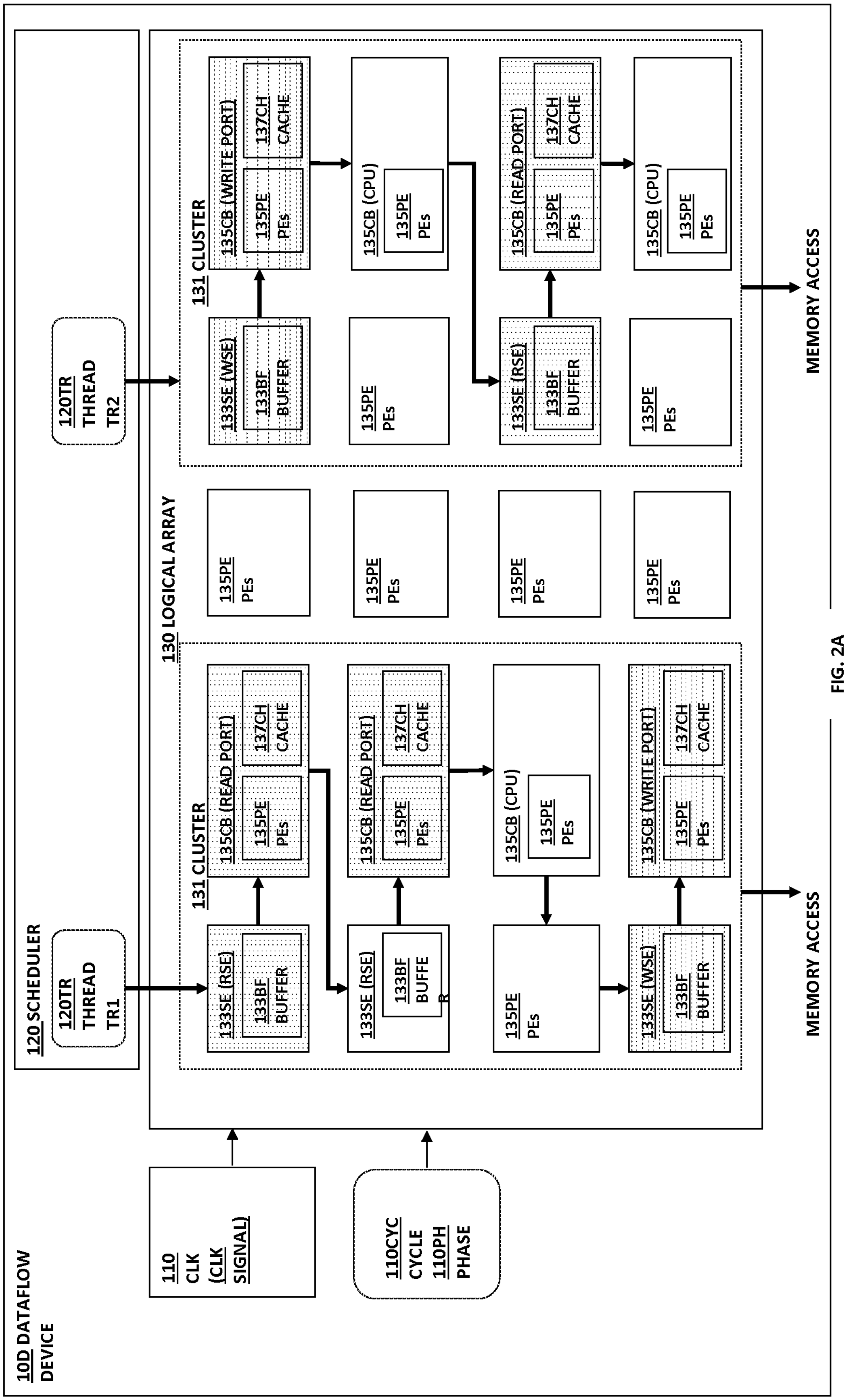
FIG. 2A is a block diagram depicting an exemplary implementation of a dataflow computing device from a hardware aspect, according to some embodiments.
Figure 2B:
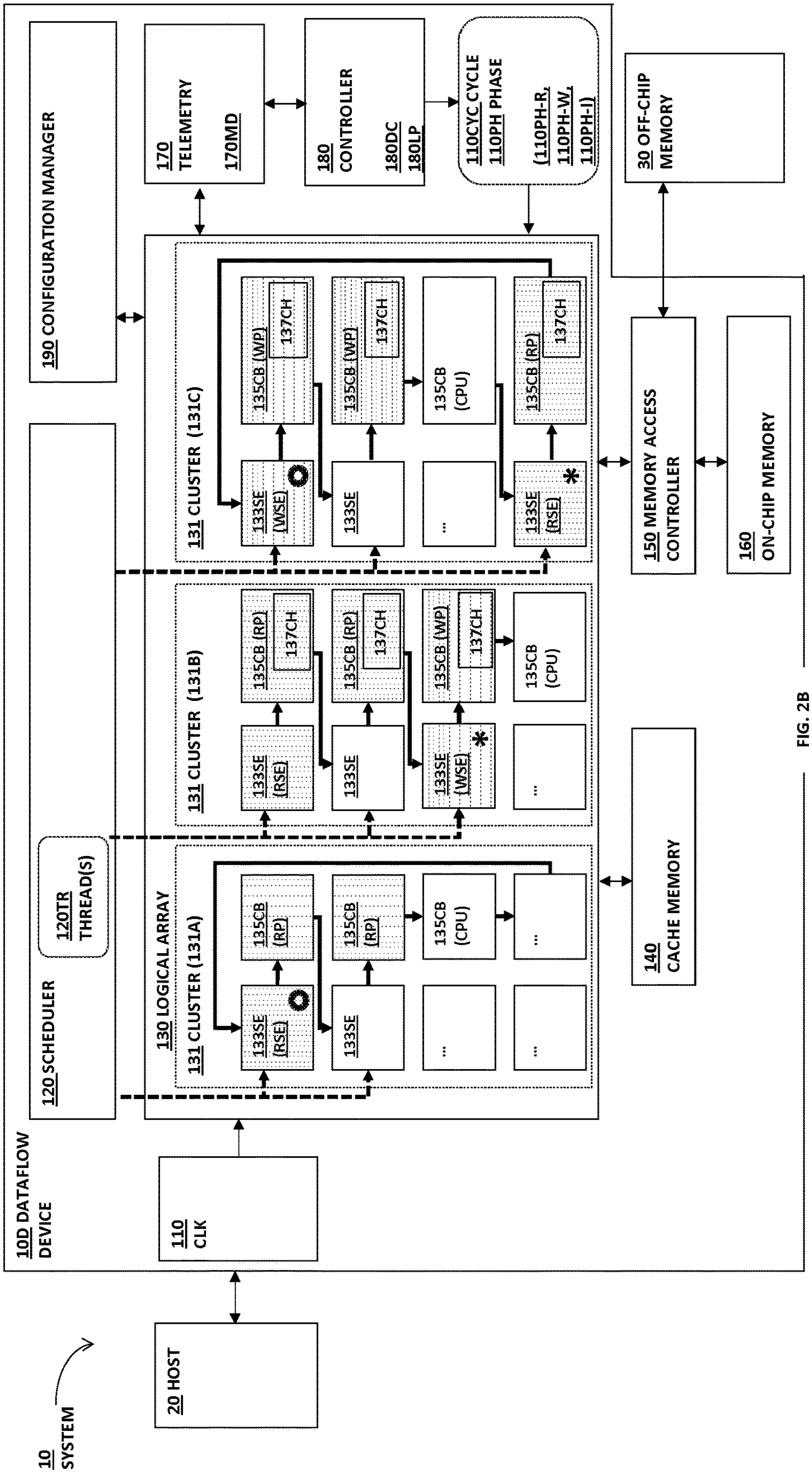
FIG. 2B is a block diagram depicting an exemplary implementation of a system for managing access to a memory device, according to some embodiments.

Reference is now made to FIG. 2A, which is a simplified block diagram depicting an exemplary implementation of a dataflow computing device 10D from a hardware aspect, according to some embodiments. Reference is also made to FIG. 2B, which is a block diagram depicting an exemplary implementation of a system 10 that may incorporate dataflow computing device 10D to manage access to an on-chip 160 or off-chip 30 memory device, according to some embodiments of the invention. It is noted that dataflow computing device 10D depicted in FIG. 2B may be the same as dataflow computing device 10D of FIG. 2A, where some components have been omitted or changed for the purpose of clarity.

According to some embodiments, dataflow computing device 10D may operate under a data-race-free (DRF) memory model. Under this model, parallel threads executing in the dataflow computing device 10D may be assumed not to have conflicting memory accesses. In other words, memory operations from different threads 120TR may be guaranteed not to overlap with addresses generated in a different thread in the same dataflow program. This assumption may allow dataflow computing device 10D to issue memory operations that are guaranteed to not be dependent on each other.

As explained herein, embodiments of the present invention may thereby exploit a synergy between the dataflow computing architecture and the DRF memory model to group memory access operations of the same type (read or write) from different threads. As explained herein, because memory operations from different threads are guaranteed not to conflict under the DRF memory model, staging elements 133SE may act as "taps", effectively grouping read operations from a plurality of threads during a read phase (denoted 110PH-R), and grouping write operations from a plurality of threads during a write phase (denoted 110PH-W), without having to compare addresses of incoming memory access requests to buffered addresses. This may allow generation of longer strings of consecutive read operations and longer strings of consecutive write operations, without need for additional buffering hardware or computational overhead associated with address comparison.

As shown in FIG. 2B, system 10 may include, or may be associated with a host computing device 20 such as computing device 1 of FIG. 1. Host 20 may be connected to the dataflow computing device 10D, and may provide one or more software processes or instructions to be executed by the dataflow computing device 10D.

As shown in FIGS. 2A and 2B, dataflow computing device 10D may include, or may be communicatively connected to a scheduler module 120. As known in the art, scheduler 120 may be configured to interpret, or obtain an interpreted version of the software instructions received from host 20 as computing threads 120TR (e.g., TR1 and TR2 of FIG. 2A), properly formatted for execution on dataflow device 10D. Scheduler 120 may inject the computing threads 120TR into Processing Elements (PEs) 135PE of the dataflow computing device 10D for execution.

Scheduler 120 may be implemented by hardware, software, or any combination thereof. For example, scheduler 120 may be implemented as a computing device similar to computing device 1 of FIG. 1, including a controller 2 adapted to execute program instructions for scheduling execution of threads 120TR and/or injecting threads 120TR into clusters 131 of computing blocks 135CB. In some embodiments, scheduler 120 may be implemented by PEs 135PE of logical array 130. Additionally, or alternatively, scheduler 120 may be implemented on a separate platform (e.g., a separate integrated circuit (IC)), and may be communicatively connected to dataflow device 10D to perform the aforementioned functions.

According to some embodiments, dataflow computing device 10D may include a plurality of clusters of interconnected PEs 135PE, organized as a logical array 130. As known in the art, one or more PEs 135PE may be mapped to, comprise, or implement computing blocks 135CB. One or more computing blocks 135CB may, in turn, be mapped to, comprise, or implement a cluster of interconnected PEs. In the schematic, non-limiting example of FIG. 2B, logical array 130 includes cluster 131A, cluster 131B, and cluster 131C, collectively referred to as clusters 131. One or more (e.g., each) cluster 131 may be statically (e.g., permanently) or dynamically (e.g., pending reconfiguration) adapted, or dedicated to handle or execute respective computing threads 120TR injected by scheduler 120.

Dataflow computing device 10D may include a clock 110 configured to maintain a globally synchronized clock signal across the clusters 131 of PEs. The clock 110 provides timing signals that are common among participating clusters 131.

According to some embodiments, a memory access cycle 110CYC may be determined based on a count of cycles of the clock signal provided by clock 110. In some embodiments, the memory access cycle 110CYC may be determined by a central phase calculation unit that counts cycles of the clock signal and distributes the current phase to participating clusters 131. In other embodiments, each cluster 131 may individually count cycles of the clock signal to determine the current phase of the memory access cycle 110CYC. In such embodiments, the globally synchronized clock signal ensures that all clusters 131 arrive at the same phase determination, even when calculated independently.

Memory access cycle 110CYC may include at least a read phase 110PH (denoted 110PH-R) and a write phase 110PH (denoted 110PH-W). Additionally, as elaborated herein, the memory access cycle may further include an intermediate phase 110PH (110PH-I), e.g., between the read phase 110PH-R and write phase 110PH-W.

In some embodiments, phase signal 110PH may indicate a value of a current phase, e.g., read phases 110PH-R, write phases 110PH-W, and intermediate phases 110PH-I that are common to all participating clusters 131. Phase signal 110PH and the values (e.g., read, write, intermediate) which it represents may therefore be used herein interchangeably.

At least one (e.g., each) cluster 131 may implement one or more Computing Blocks (CBs) 135CB and one or more Staging Elements (SE) 133SE. The computing blocks 135CB may be configured as ports to perform memory access operations on a memory device. In the schematic example of FIG. 2B, computing blocks 135CB labeled “RP” (Read Port) indicate computing blocks that implement, or are configured as ports to perform memory read operations. In a complementary manner, computing blocks 135CB labeled “WP” (Write Port) indicate computing blocks that implement, or are configured as ports to perform memory write operations. Additionally, computing blocks 135CB labeled “CPU” indicate computing blocks configured to perform general processing operations.

As used herein, the term “staging element” may refer to a hardware component or logic circuit associated with a memory port (e.g., write port 135CB-WP and/or read port 135CB-RP) that is capable of temporarily delaying or holding a memory access request and/or its associated computing thread, until a predetermined phase of a globally synchronized memory access cycle is reached. Staging elements may be implemented, for example, by one or more computing blocks 135CB as a reservation station, a buffer, a register, a control gate, or any combination thereof. In some embodiments, staging elements may be implemented locally, e.g., by one or more processing elements (PEs) within a cluster 131 that also implements the associated memory port (135CB-WP/135CB-RP). Additionally, or alternatively, staging elements may be located at or near a memory access controller 150. Staging elements 133SE may thereby serve as control points that regulate the flow of memory access operations based on the current phase of the memory access cycle.

As shown in FIGS. 2A and 2B, at least one (e.g., each) SE 133SE may be dedicated to managing a corresponding port (or a corresponding computing block 135CB that is configured as a port). The at least one SE 133SE may be configured to control execution of a memory access operation by that port based on a current phase (e.g., read, write, intermediate) 110PH of memory access cycle 110CYC.

In the example of FIG. 2B, staging elements 133SE labeled “RSE” (Read Staging Element) indicate elements that are dedicated to managing memory read access requests during read phases of the memory access cycle 110CYC. In a complementary manner, staging elements 133SE labeled “WSE” (Write Staging Element) indicate elements that are dedicated to managing memory write access requests during write phases of the memory access cycle 110CYC.

According to some embodiments, dataflow computing device 10D may include a configuration manager 190 configured to attribute an access identifier value to at least one (e.g., each) staging element 133SE. In some embodiments, configuration manager 190 may be configured to attribute initial access identifier values prior to execution of threads 120TR on dataflow device 10D, based on static analysis of software instructions received from host 20. For example, configuration manager 190 may attribute initial access identifier values to staging elements 133SE as part of compilation or projection of host 20 software instructions into computing threads 120TR, to be mapped, and scheduled to run on computing blocks 135CB of logical array 130.

Additionally, or alternatively, configuration manager 190 may refine or update attribution of access identifier values to staging elements 133SE during run time, based on aggregated telemetry 170MD to optimize memory access throughput, e.g., following reconfiguration of PEs in logical array 130, or when tapping or un-tapping of specific threads is determined to be detrimental.

For example, during execution of threads 120TR on device 10D, configuration manager 190 may detect that a particular staging element 133SE is causing excessive thread stalls in its respective port. If a staging element 133SE attributed with a read type or write type is blocking threads for extended periods, configuration manager 190 may un-tap that staging element by removing its access identifier attribution, allowing threads to proceed without phase-based blocking at that point. Embodiments of the invention may resort to other means, such as existing reordering buffers to handle the reordering of memory access operations in such specifically detected ports.

Conversely, configuration manager 190 may detect that a particular port is underutilizing phase-based blocking. If metadata 170MD indicates that a port is relying on existing reordering buffers while exhibiting a consistent pattern of same-type memory access operations, configuration manager 190 may attribute an access identifier to the corresponding staging element 133SE, thereby enabling phase-based blocking to offload the reordering buffers and improve overall memory access throughput.

The access identifier value may be selected from a read type and a write type. Staging elements 133SE attributed with the read type may be designated as Read Staging Elements (RSEs), and staging elements 133SE attributed with the write type may be designated as Write Staging Elements (WSEs). Staging elements 133SE of the read type (RSEs) may be configured to activate corresponding ports to perform memory read operations only during the read phase 110PH-R. Staging elements 133SE of the write type (WSEs) may be configured to activate corresponding ports to perform memory write operations only during the write phase 110PH-W.

During the read phase, staging elements 133SE dedicated to ports having a pending memory write operation may block execution of those memory write operations, allowing only memory read access requests to reach a memory access controller 150 and/or on-chip 160 or off-chip memory 30.

During the write phase, staging elements 133SE dedicated to ports having a pending memory read operation may block execution of those memory read operations, allowing only memory write access requests to reach memory access controller 150 and/or on-chip 160 or off-chip memory 30.

In other words, staging elements 133SE may generate strings of memory access requests of the same type, separated by phases of memory access cycle 110CYC. By blocking execution of memory access operations based on the current phase, the staging elements 133SE may generate strings of consecutive read operations and strings of consecutive write operations for accessing the memory device. It may be appreciated that generating such separated strings may reduce read-to-write switching penalties associated with memory access, thereby improving memory access performance.

As known in the art of dataflow computing, thread progression may be based on availability of data. As shown in FIG. 2B, staging elements 133SE within each cluster 131 may be connected in sequence, allowing controlled progress of threads through different memory operations. By blocking a memory access operation, a staging element 133SE may hold the context of a thread until the appropriate phase. Embodiments of the invention may thereby synchronize memory access operations across the dataflow computing device 10D.

In some embodiments, configuration manager 190 may attribute the write type (WSE) to staging elements 133SE that correspond to computing blocks 135CB configured as ports performing a memory write operation (Write Ports (WP)) and that precede, along the thread, computing blocks 135CB configured as ports performing a memory read operation (Read Ports (RP)). This is demonstrated, for example, by the WSE staging element 133SE marked by asterisk (*) in cluster 131B of FIG. 2B.

Similarly, configuration manager 190 may attribute the read type (RSE) to staging elements 133SE that correspond to computing blocks 135CB configured as ports performing a memory read operation and that precede, along the thread, computing blocks 135CB configured as ports performing a memory write operation. This is demonstrated, for example, by the RSE staging element 133SE marked by asterisk (*) in cluster 131C of FIG. 2B.

It may be appreciated that this attribution may "tap" the flow of threads at points where memory access operations switch types, allowing separation of memory access operations according to their types (read or write) from a plurality of threads throughout logical array 130.

Additionally, or alternatively, configuration manager 190 may attribute the write type (WSE) only to staging elements 133SE that correspond to first computing blocks 135CB along the thread in a series of computing blocks 135CB configured as ports that perform memory write operations (WP). This is demonstrated, for example, by the WSE staging element 133SE marked by a ring (⭘) in cluster 131C of FIG. 2B.

Similarly, configuration manager 190 may attribute the read type (RSE) only to staging elements 133SE that correspond to first computing blocks 135CB along the thread in a series of computing blocks 135CB configured as ports that perform memory read operations (RP). This is demonstrated, for example, by the RSE staging element 133SE marked by a ring (⭘) in cluster 131A of FIG. 2B.

It may be appreciated that this attribution may "tap" the flow of threads at the beginning of a series of same-type memory access operations, similarly resulting in separation of memory access operations according to their types (read or write) from a plurality of threads handled by PE clusters 131 of logical array 130.

According to some embodiments, dataflow computing device 10D may include a memory access controller 150 configured to manage access to on-chip memory 160 and/or off-chip memory 30 devices. In some embodiments, memory access controller 150 may coordinate memory read and write operations performed by computing blocks 135CB configured as ports (RP, WP).

The on-chip memory 160 may provide local storage within the dataflow computing device 10D. The off-chip memory 30 may be external to the dataflow computing device 10D and may be connected thereto. According to some embodiments, one or more computing blocks 135CB may include an associated cache memory 137CH for local data caching. Additionally, or alternatively, the dataflow computing device 10D may include one or more elements of cache memory 140 that may provide shared caching capabilities for the logical array 130.

As explained herein, dataflow computing device 10D may include one or more telemetry modules 170 that may be implemented by, or be adapted to communicates with, PEs of clusters 131. Telemetry modules 170 may thereby monitor memory access operations by clusters 131.

For example, telemetry module(s) 170 may be configured to collect metadata 170MD representing operational statistics pertaining to attempted memory access operations by the clusters 131. As explained herein, a processor or controller 180 (such as controller 1 of FIG. 1) may utilize metadata 170MD to dynamically calculate properties of memory access cycle 110CYC, to obtain optimal utilization of memory access. Such optimized properties may include, for example, a length of the memory access cycle 110CYC, and/or a duty cycle between read and write phases of memory access cycle 110CYC. The term "duty cycle" may be used in this context to define a ratio between a count of cycles of the clock signal allocated to the read phase and a count of cycles of the clock signal allocated to the write phase. In another example, the optimized properties may include a period of overlap, defining an intermediate phase in the memory access cycle in which concurrent handling of both read and write memory access requests may be handled.

Figure 3A:
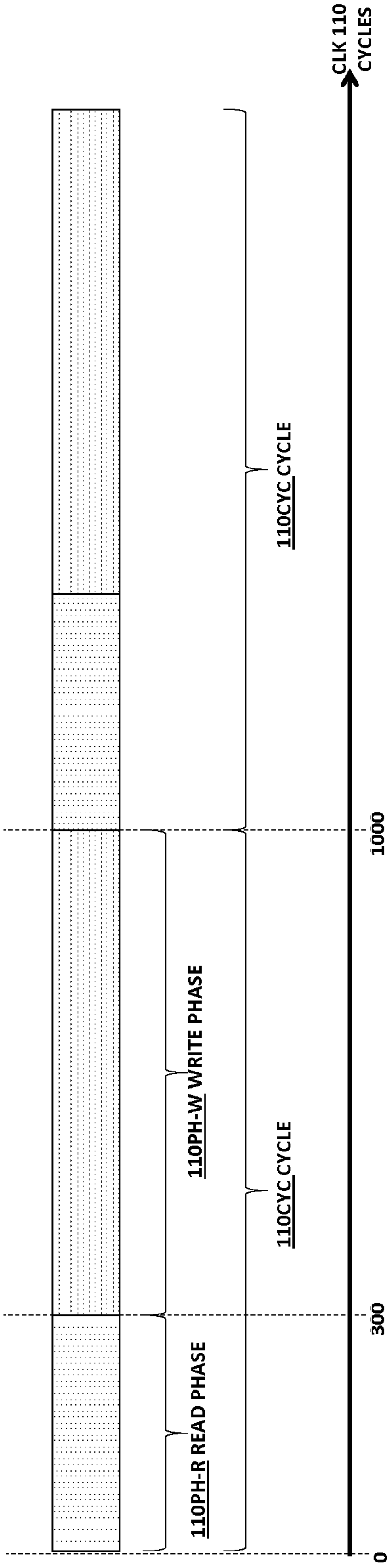
FIG. 3A is a schematic diagram showing an exemplary waveform of a memory access cycle, according to some embodiments.
Figure 3B:
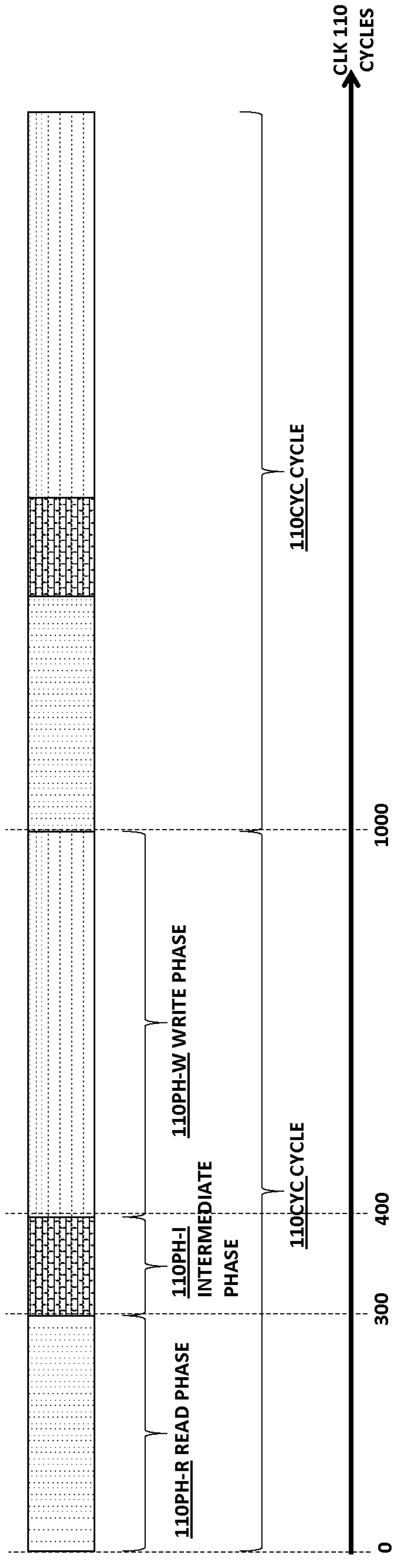
FIG. 3B is a schematic diagram showing another exemplary waveform of a memory access cycle with an intermediate phase, according to some embodiments.

Reference is further made to FIGS. 3A and 3B which are schematic diagrams showing non-limiting examples for waveforms of access cycle 110CYC, according to some embodiments of the invention. As shown in FIG. 3A, memory access cycle 110CYC may include a first phase (e.g., a read phase, 110PH-R) followed by a second phase (e.g., a write phase, 110PH-W). In the example of FIG. 3A, read phase 110PH-R is 300 clock CLK 110 cycles long, whereas write phase 110PH-W is 700 clock CLK 110 cycles long. In this example, the term duty cycle may reflect a ratio between lengths of the read an write phases, e.g., 3/7.

As shown in FIG. 3A, memory access cycle 110CYC may further include an intermediate phase 110PH-I in which concurrent handling of both read and write memory access requests may be handled, e.g., propagated to memory access controller 150 and/or to memory devices 30/160 rather than being blocked by their respective SEs 133SE. In the example of FIG. 3B, intermediate phase 110PH-I may be located between the first phase (e.g., read phase, 110PH-R) and the second phase (e.g., a write phase, 110PH-W), and may be 100 cycles long of clock 110. In this example, the term duty cycle may reflect a ratio between lengths of the read an write phases, e.g., 3/6.

Figure 4A:
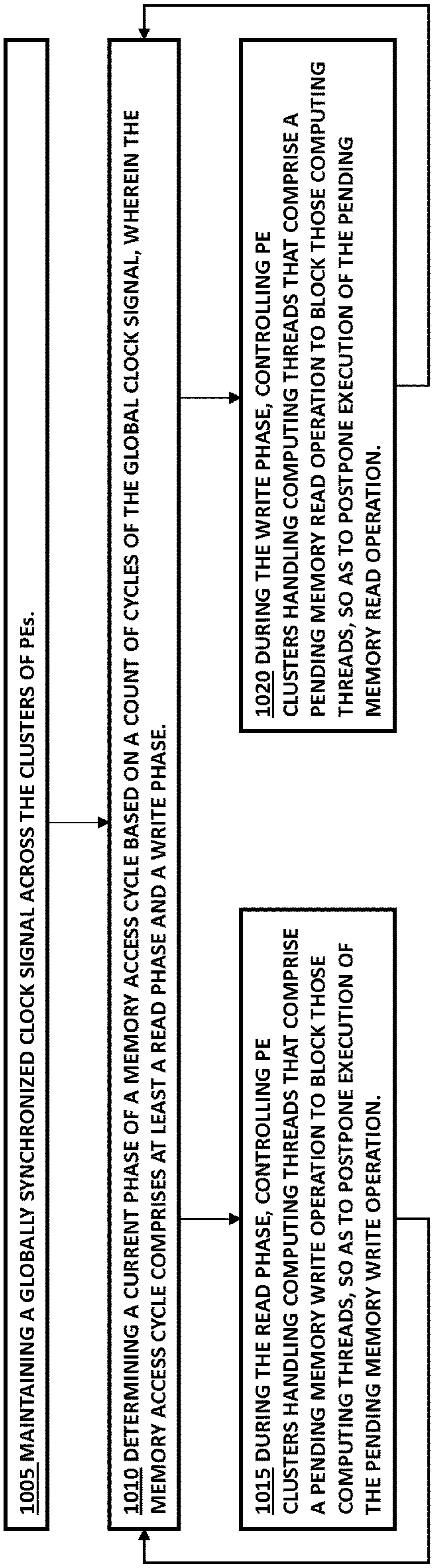
FIG. 4A is a flow diagram depicting a method of managing access to a memory device by a dataflow computing device, according to some embodiments.

Reference is further made to FIG. 4A, which is a flow diagram depicting a method of managing access to a memory device (e.g., on-chip memory 160 or off-chip memory 30) by a dataflow computing device such as device 10D of FIG. 2B, according to some embodiments.

As explained herein, dataflow computing device 10D may be adapted to handle computing threads (e.g., 120TR of FIG. 2B) via associated clusters (e.g., 131 of FIG. 2B) of interconnected processing elements (PEs).

At step 1005, dataflow computing device 10D may maintain a globally synchronized clock signal across clusters 131 of PEs. As explained herein, the globally synchronized clock signal may ensure that all participating clusters 131 may operate according to a common memory access cycle 110CYC.

As explained herein, configuration manager 190 may attribute access identifier values to staging elements 133SE (designating them as RSEs or WSEs) to "tap" the flow of threads at points where memory access operations switch types. This attribution may be initially performed by static code analysis prior to execution, e.g., as part of compiling, mapping, or projection of software instructions received from host 20. Additionally, or alternatively, the attribution may be updated during run time based on telemetry, e.g., when configuration manager 190 detects excessive thread stalls or changes in workload characteristics.

Similarly, an initial duty cycle between the read phase 110PH-R and the write phase 110PH-W may be determined by static code analysis prior to execution. For example, static analysis may estimate a ratio between memory read operations and memory write operations based on the structure of the software instructions, and set an initial duty cycle accordingly. In another example, static analysis may identify memory access patterns in loops or repetitive code structures to predict an expected distribution of read and write operations.

During run time, the duty cycle may be updated or recalculated based on telemetry collected by telemetry module 170. For example, if accumulated metadata 170MD indicates that the actual ratio between attempted memory read operations and attempted memory write operations differs from the initial estimate, controller 180 may recalculate the duty cycle to better reflect the observed workload. In another example, if metadata 170MD indicates changes in cache hit or miss rates for read or write operations, controller 180 may adjust the duty cycle to accommodate the resulting changes in memory access demand.

At step 1010, a current phase of a memory access cycle 110CYC may be determined based on a count of cycles of the global clock signal (e.g., provided by clock 110 of FIG. 2B). According to some embodiments, the memory access cycle 110CYC may include at least a read phase (e.g., 110PH-R of FIG. 2B) and a write phase (e.g., 110PH-W of FIG. 2B). The current phase may be determined based on the count of cycles of the global clock signal. This determination may be performed globally, e.g., for all participating clusters 131, or locally, e.g., by each individual cluster 131. For example, staging elements 133SE may count cycles of the clock signal and compare the count to a length of the read phase and a length of the write phase to ascertain the current phase accordingly. Staging elements 133SE may then be activated at the respective phases: staging elements 133SE designated as RSEs may be activated during the read phase of the memory access cycle to allow memory read operations to proceed, while staging elements 133SE designated as WSEs may be activated during the write phase of the memory access cycle to allow memory write operations to proceed.

At step 1015, the current phase is the read phase 110PH-R. In this phase, dataflow computing device 10D may control PE clusters 131 handling computing threads 120TR that include a pending memory write operation to block those computing threads, so as to postpone execution of the pending memory write operation, allowing only memory read access requests to reach memory access controller (e.g., 150 of FIG. 2B) and on-chip memory (e.g., 160 of FIG. 2B) or off-chip memory (e.g., 30 of FIG. 2B).

At step 1020, the current phase is the write phase 110PH-W. In this phase, dataflow computing device 10D may control PE clusters 131 handling computing threads 120TR that include a pending memory read operation to block those computing threads, so as to postpone execution of the pending memory read operation, allowing only memory write access requests to reach memory access controller 150 and on-chip memory 160 or off-chip memory 30.

It may be appreciated that by blocking execution of memory access operations based on the current phase, staging elements 133SE may cumulatively generate strings of consecutive read operations and strings of consecutive write operations, separated over time. In other words, staging elements 133SE may control access to on-chip memory 160 or off-chip memory 30 with consecutive read or write operations, to mitigate the problem of read-to-write or write-to-read switching penalty, thereby improving memory access throughput without need for additional buffering hardware or logic.

As shown in FIG. 4A, the process of controlling optimal data access to memory access controller 150 and on-chip memory 160 or off-chip memory 30 may be repeated. This repetition may proceed indefinitely, or terminate e.g., when execution of thread 120TR is completed and/or when device 10D is reconfigured to process newly injected computational threads 120TR from scheduler 120.

Figure 4B:
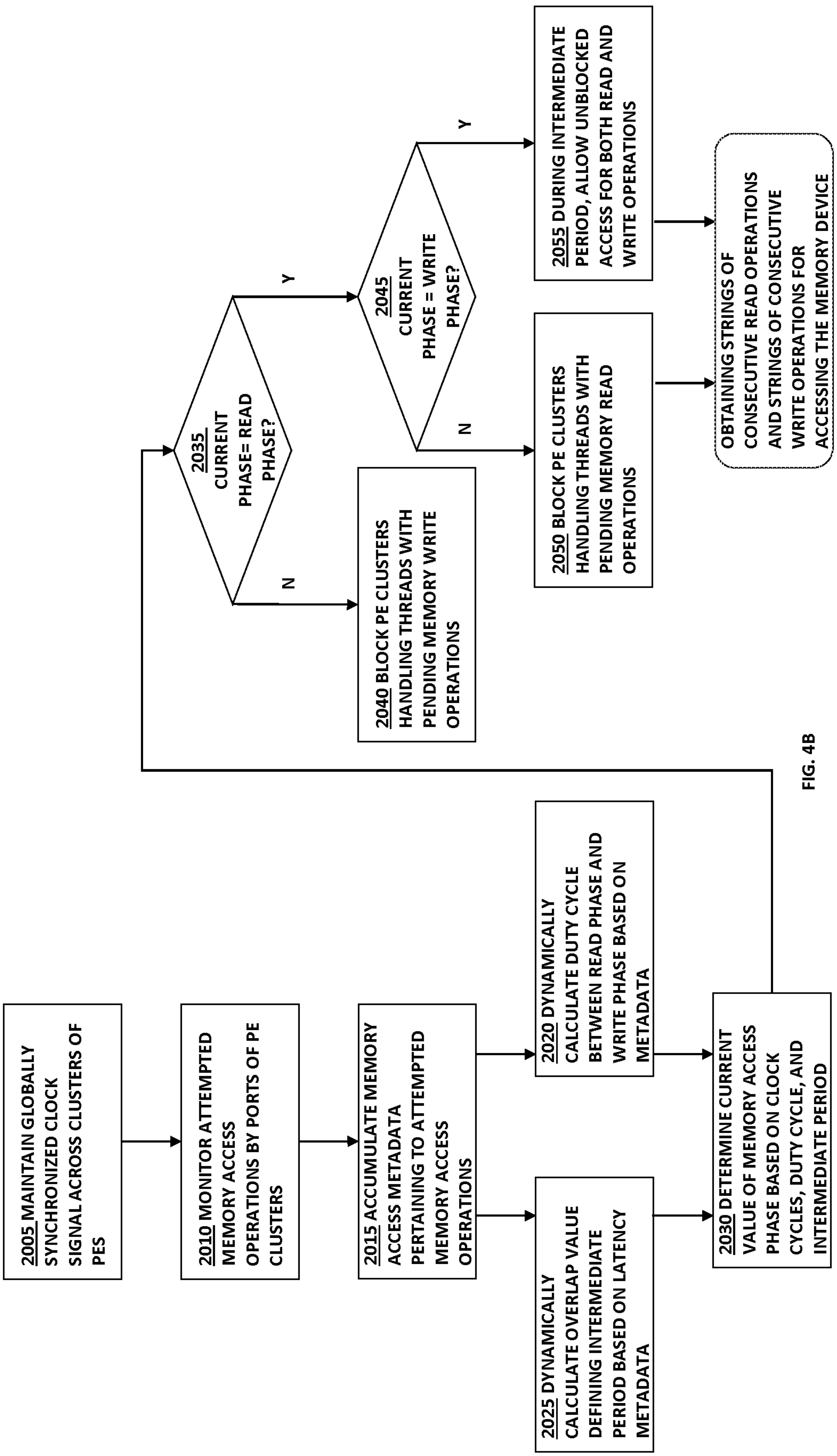
FIG. 4B is a flow diagram depicting another method of managing access to a memory device by a dataflow computing device, according to some embodiments.

Reference is further made to FIG. 4B, which is a flow diagram depicting another method of managing access to a memory device (e.g., on-chip memory 160 or off-chip memory 30) by a dataflow computing device such as device 10D of FIG. 2B, according to some embodiments.

At step 2005, a globally synchronized clock signal 110 may be maintained across clusters 131 of processing elements (PEs). As explained herein, clock 110 may be configured to provide timing signals that are global, in a sense that they may be common among two or more participating clusters 131 of logical array 130. The globally synchronized clock signal may ensure that all clusters 131 operate according to a common memory access cycle 110CYC.

At steps 2010 and 2015, attempted memory access operations by ports of the PE clusters may be monitored and memory access metadata 170MD pertaining to the attempted memory access operations may be accumulated.

According to some embodiments, telemetry module 170 may be configured to monitor memory access operations performed by computing blocks 135CB configured as ports (e.g., RPs and WPs of FIG. 2B) within clusters 131. Telemetry module 170 may communicate with clusters 131 to observe attempted memory read operations and attempted memory write operations to accumulate memory access metadata 170MD. Additionally, or alternatively, telemetry module 170 may communicate with an on-chip (as shown in FIG. 2B) or off-chip memory access controller to accumulate memory access metadata 170MD.

Memory access metadata 170MD may represent operational statistics pertaining to attempted memory access operations by clusters 131. Such memory access metadata 170MD may include, for example, a number of attempted memory read operations within a first predetermined timeframe, a number of attempted memory write operations within the first timeframe, a ratio between attempted memory read operations and attempted memory write operations, and the like.

Additionally, or alternatively, memory access metadata 170MD may include a number of cache hits for memory read operations within a second predetermined timeframe and/or a number of cache misses for memory read operations within the second timeframe (which may, or may not be the same as the first timeframe).

Additionally, or alternatively, memory access metadata 170MD may include a number of cache hits for memory write operations within a third predetermined timeframe, and/or a number of cache misses for memory write operations within the third timeframe (which may, or may not be the same as the first or second timeframe).

Additionally, or alternatively, memory access metadata 170MD may include or represent data pertaining to latency of the memory access operations, such as statistics of latency of read and write operations on on-chip memory 160 and/or off-chip memory 30.

At step 2020, controller 180 may dynamically calculate a duty cycle 180DC between the read phase 110PH-R and the write phase 110PH-W based on the accumulated metadata 170MD. Duty cycle 180DC may define a ratio between a count of cycles of the clock signal 110 allocated to the read phase 110PH-R and a count of cycles of the clock signal allocated to the write phase 110PH-W. The duty cycle may be used to optimize memory access performance based on observed application behavior.

For example, controller 180 may calculate duty cycle 180DC based on a ratio between attempted memory read operations and attempted memory write operations, weighted by the latency of those operations. In an embodiment where the accumulated metadata 170MD indicates that 70% of attempted memory access operations are read operations and 30% are write operations, and where read operations and write operations have similar latencies, controller 180 may set duty cycle 180DC such that 70% of the cycles of the clock signal are allocated to the read phase 110PH-R and 30% are allocated to the write phase 110PH-W. In an embodiment where read operations have higher latency than write operations, controller 180 may adjust duty cycle 180DC to allocate a greater portion of the memory access cycle to the read phase 110PH-R, so as to accommodate the longer duration of read operations.

Additionally, or alternatively, controller 180 may calculate duty cycle 180DC based on cache miss counts for read and write operations. Cache misses may result in memory access operations that reach on-chip memory 160 or off-chip memory 30, whereas cache hits may be serviced by cache memory 137CH or cache memory 140 without accessing the memory device. In an embodiment where the accumulated metadata 170MD indicates a higher rate of cache misses for specific regions in memory, or for specific operations (e.g., memory write) than for other operations (e.g., memory read), controller 180 may adjust duty cycle 180DC to allocate a greater portion of the memory access cycle to one phase (e.g., write phase 110PH-W), so as to accommodate the increased demand for these memory access operations.

In another example, controller 180 may adjust an overall length of memory access cycle 110CYC based on a counted influx of memory access requests. In an embodiment where the accumulated metadata 170MD indicates a high rate of incoming memory access requests, controller 180 may increase the length of memory access cycle 110CYC to allow more memory access operations to accumulate during each phase, thereby generating longer strings of consecutive read operations and longer strings of consecutive write operations. Longer strings may further reduce read-to-write switching penalties. In an embodiment where the accumulated metadata 170MD indicates a low rate of incoming memory access requests, controller 180 may decrease the length of memory access cycle 110CYC to reduce latency experienced by individual memory access operations waiting for the appropriate phase.

When latency of memory access operations is relatively long, it may be beneficial to initiate, or "ramp-up" a memory access operation of a first type while a previous memory access operation of an opposite type is still being handled. For example, during a transition from read phase 110PH-R to write phase 110PH-W, an intermediate phase 110PH-I may allow memory write operations to begin while pending memory read operations with long latency are still completing. This may reduce idle time between phases and improve overall memory access throughput.

Additionally, or alternatively, and as shown in step 2025, controller 180 may dynamically calculate an overlap value 180LP defining an intermediate period based on latency metadata 170MD. According to some embodiments, controller 180 may calculate the overlap value 180LP based on observed latency of memory access operations. As latency increases, controller 180 may increase the overlap value to cover for time lost during phase transitions and minimize read-to-write switching penalties. The overlap value 180LP may define an intermediate phase 110PH-I between read phase 110PH-R and write phase 110PH-W. During intermediate phase 110PH-I, PE clusters 131 handling computing threads having a pending memory read operation and PE clusters 131 handling computing threads having a pending memory write operation may not be blocked, allowing simultaneous handling of both read and write memory access operations. In other words, staging elements 133SE dedicated to ports having a pending memory read operation (RP) and staging elements 133SE dedicated to ports having a pending memory write operation (WP) are configured not to block the operations of these ports (computing blocks 135CB of ports WP/RP) during intermediate phase 110PH-I.

As explained herein, memory access cycle 110CYC may include at least a read phase 110PH-R and a write phase 110PH-W, and may further include an intermediate phase 110PH-I. As shown in step 2030, a current value of the memory access phase 110PH (e.g., 110PH-R, 110PH-W or 110PH-I) may be determined based on clock cycles 110, the calculated duty cycle 110DC, and the overlap value 180LP (the intermediate period). For example, the current phase 110PH of the memory access cycle 110CYC may be determined globally (e.g., by logical array 130) for all participating clusters 131 based on a count of cycles of the global clock signal 110. Additionally, or alternatively, the current phase 110PH of the memory access cycle 110CYC may be determined locally, e.g., by PEs of one or more (e.g., each) individual clusters.

At step 2035, staging elements 133SE may determine whether the current phase 110PH is the read phase 110PH-R. If so, the method may proceed to step 2040. Otherwise, the method may proceed to step 2045. At step 2040 (current phase 110PH is a read phase 110PH-R), PE clusters handling threads with pending memory write operations may be blocked. According to some embodiments, during the read phase, staging elements 133SE dedicated to ports having a pending memory write operation (Write Staging Elements (WSEs)) may block execution of those memory write operations. Simultaneously, staging elements 133SE dedicated to ports having a pending memory read operation (Right Staging Elements (RSEs)) may propagate execution of those memory read operations. This may postpone execution of the pending memory write operations, allowing only memory read access requests to reach memory access controller 150 and/or on-chip memory 160 or off-chip memory 30.

At step 2045, staging elements 133SE may determine whether the current phase 110PH is the write phase 110PH-W. If so, the method may proceed to step 2050. Otherwise (indicating the intermediate phase 110PH-I), the method may proceed to step 2055. At step 2050 (current phase 110PH is a write phase 110PH-W), PE clusters handling threads with pending memory read operations may be blocked. According to some embodiments, during write phase 110PH-W, staging elements 133SE dedicated to ports having a pending memory read operation (RSEs) may block execution of those memory read operations. Simultaneously, staging elements 133SE dedicated to ports having a pending memory write operation (WSEs) may propagate execution of those memory write operations. This may postpone execution of the pending memory read operations, allowing only memory write access requests to reach memory access controller 150 and/or on-chip memory 160 or off-chip memory 30.

At step 2055 (current phase 110PH is an intermediate phase 110PH-I), unblocked access for both read and write operations may be allowed. According to some embodiments, during intermediate phase 110PH-I, PE clusters handling computing threads having a pending memory read operation and PE clusters handling computing threads having a pending memory write operation are not blocked by their respective staging elements 133SE. Both memory read operations and memory write operations may proceed without blocking during the intermediate phase.

It may be appreciated that by blocking execution of memory access operations based on the current phase, staging elements 133SE may generate strings of consecutive read operations and strings of consecutive write operations for accessing on-chip memory 160 or off-chip memory 30.

According to some embodiments, at least one staging element 133SE may include a buffer 133BF configured to store a plurality of requested memory access operations pertaining to a handled thread. Staging elements 133SE of the read type (RSEs) may be configured to buffer a plurality of requested memory read operations pertaining to the handled thread, so as to accumulate the memory read operations during a write phase of the memory access cycle 110CYC. Similarly, staging elements 133SE of the write type (WSEs) may be configured to buffer a plurality of requested memory write operations pertaining to the handled thread, so as to accumulate the memory write operations during a read phase of the memory access cycle 110CYC.

Buffering memory access operations during an opposite phase may allow staging elements 133SE to accumulate multiple pending operations, which may then be executed as a batch when the appropriate phase begins. This may increase the length of strings of consecutive read operations or strings of consecutive write operations, further reducing read-to-write switching penalties.

According to some embodiments, one or more (e.g., each) staging element 133SE may be further configured to reorder the buffered 133BF memory access operations prior to execution based on one or more optimization criteria. The optimization criteria may include, for example, memory addresses of the buffered operations, expected latency of the buffered operations, memory bank or channel distribution, priority values associated with the buffered operations, temporal locality of the buffered operations, and the like.

For example, staging element 133SE may reorder buffered 133BF memory access operations based on memory addresses of the buffered operations 133BF, so as to group operations targeting adjacent memory addresses. It may be appreciated that grouping operations by address may improve cache utilization and reduce memory access latency.

In another example, staging element 133SE may reorder buffered memory access operations 133BF based on expected latency of the buffered operations 133BF. Operations with shorter expected latency may be executed first, allowing faster completion of a greater number of operations within a given phase.

In another example, staging element 133SE may reorder buffered 133BF memory access operations based on priority values associated with the buffered operations 133BF. Operations associated with higher priority threads or time-sensitive tasks may be executed before lower priority operations.

In yet another example, staging element 133SE may reorder buffered 133BF memory access operations based on temporal locality of the buffered operations 133BF. Operations targeting memory addresses that have been recently accessed may be grouped together to take advantage of cached data in cache memory 137CH or cache memory 140.

Unless explicitly stated, the method embodiments described herein are not constrained to a particular order or sequence. Additionally, some of the described method embodiments or elements thereof may occur or be performed at the same point in time. While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention. Various embodiments have been presented. Each of these embodiments may of course include features from other embodiments presented, and embodiments not specifically described may include various features described herein.

The invention claimed is:

1. A method of managing access to a memory device by a dataflow computing device, wherein the dataflow computing device is adapted to handle computing threads via associated clusters of interconnected processing elements (PEs), the method comprising:

maintaining a globally synchronized clock signal across the clusters of PEs;

determining a current phase of a memory access cycle based on a count of cycles of the global clock signal, wherein the memory access cycle comprises at least a read phase and a write phase;

during the read phase, controlling PE clusters handling computing threads that comprise a pending memory write operation to block those computing threads, so as to postpone execution of the pending memory write operation; and during the write phase, controlling PE clusters handling computing threads that comprise a pending memory read operation to block those computing threads, so as to postpone execution of the pending memory read operation, thereby generating strings of consecutive read operations and strings of consecutive write operations for accessing the memory device.

2. The method of claim 1, wherein at least one PE cluster implements:

one or more computing blocks configured as ports to perform memory access operations of the associated thread on the memory device; and one or more staging elements, wherein each staging element is dedicated to a corresponding port and configured to control execution of a memory access operation by that port based on a current phase of the memory access cycle.

3. The method of claim 2, further comprising attributing an access identifier value to one or more staging elements, wherein the access identifier value is selected from a read type, and a write type, wherein staging elements of the read type are configured to activate corresponding ports to perform memory read operations only during the read phase, and wherein staging elements of the write type are configured to activate corresponding ports to perform memory write operations only during the write phase.

4. The method of claim 3, wherein attributing the access identifier value comprises:

attributing the write type to staging elements that correspond to computing blocks configured as ports performing a memory write operation and that precede, along the thread, computing blocks configured as ports performing a memory read operation; and attributing the read type to staging elements that correspond to computing blocks configured as ports performing a memory read operation and that precede, along the thread, computing blocks configured as ports performing a memory write operation.

5. The method of claim 3, wherein attributing the access identifier value comprises:

attributing the write type only to staging elements that correspond to first computing blocks along the thread in a series of computing blocks configured as ports that perform memory write operations; and attributing the read type only to staging elements that correspond to first computing blocks along the thread in a series of computing blocks configured as ports that perform memory read operations.

6. The method of claim 3, wherein at least one staging element of a read type is further configured to buffer a plurality of requested memory read operations pertaining to the handled thread, so as to accumulate the memory read operations during a write phase of the memory access cycle, and wherein at least one staging element of a write type is further configured to buffer a plurality of requested memory write operations pertaining to the handled thread, so as to accumulate the memory write operations during a read phase of the memory access cycle.

7. The method of claim 6, wherein each staging element is further configured to reorder the buffered memory access operations prior to execution based on one or more optimization criteria, wherein the optimization criteria are selected from a list consisting of: memory addresses of the buffered operations, expected latency of the buffered operations, memory bank or channel distribution, priority values associated with the buffered operations, and temporal locality of the buffered operations.

8. The method of claim 1, wherein the dataflow computing device is configured to operate under a data-race-free (DRF) memory model, thereby guaranteeing that addresses of memory access operations of a first computing thread do not overlap addresses of memory access operations generated by a second computing thread handled by the dataflow computing device.

9. The method of claim 1, further comprising:

monitoring attempted memory access operations by ports of the PE clusters;

based on the monitoring, accumulating memory access metadata pertaining to the attempted memory access operations;

based on the memory access metadata, dynamically calculating a duty cycle between the read phase and the write phase, wherein the duty cycle defines a ratio between a count of cycles of the global clock signal allocated to the read phase and a count of cycles of the global clock signal allocated to the write phase; and determining the current phase of the memory access cycle further based on the calculated duty cycle.

10. The method of claim 9, wherein the memory access metadata is selected from a list consisting of: a number of attempted memory read operations within a first predetermined timeframe, a number of attempted memory write operations within the first timeframe, and a ratio between attempted memory read operations and attempted memory write operations.

11. The method of claim 9, wherein the memory access metadata is selected from a list consisting of: a number of cache hits for memory read operations within a second predetermined timeframe, a number of cache misses for memory read operations within the second timeframe, a number of cache hits for memory write operations within a third predetermined timeframe, and a number of cache misses for memory write operations within the third timeframe.

12. The method of claim 9, wherein the memory access metadata represents latency of the memory access operations, and wherein the method further comprises:

based on the memory access metadata, dynamically calculating an overlap value, defining an intermediate phase between the read phase and the write phase; and determining the current phase of the memory access cycle further based on the intermediate phase.

13. The method of claim 12, wherein during the intermediate phase, PE clusters handling computing threads having a pending memory read operation and PE clusters handling computing threads having a pending memory write operation are not blocked.

14. A dataflow computing device comprising:

a plurality of clusters of interconnected processing elements (PEs), adapted to handle computing threads; and a clock configured to maintain a globally synchronized clock signal across the clusters of PEs, wherein a memory access cycle is determined based on a count of cycles of the clock signal, and wherein the memory access cycle comprises a read phase and a write phase, wherein at least one PE cluster implements:

one or more computing blocks configured as ports to perform memory access operations on a memory device; and one or more staging elements, each dedicated to a corresponding port and configured to control execution of memory access operations by that port based on a current phase of the memory access cycle.

15. The dataflow computing device of claim 14 wherein (a) staging elements dedicated to ports that have a pending memory write operation are configured to block execution of those memory write operations during a read phase of the memory access cycle, and (b) staging elements dedicated to ports that have a pending memory read operation are configured to block execution of those memory read operations during a write phase of the memory access cycle, thereby generating strings of consecutive read operations and strings of consecutive write operations for accessing the memory.

16. The dataflow computing device of claim 14, further comprising a controller configured to:

monitor attempted memory access operations by ports of the PE clusters;

accumulate memory access metadata pertaining to the attempted memory access operations; and dynamically calculate a duty cycle between the read phase and the write phase based on the accumulated metadata, wherein the duty cycle defines a ratio between a count of cycles of the clock signal allocated to the read phase and a count of cycles of the clock signal allocated to the write phase.

17. The dataflow computing device of claim 16, wherein the memory access metadata is selected from a list consisting of: a number of attempted memory read operations within a first predetermined timeframe, a number of attempted memory write operations within the first timeframe, and a ratio between attempted memory read operations and attempted memory write operations.

18. The dataflow computing device of claim 16, wherein the memory access metadata is selected from a list consisting of: a number of cache hits for memory read operations within a second predetermined timeframe, a number of cache misses for memory read operations within the second timeframe, a number of cache hits for memory write operations within a third predetermined timeframe, and a number of cache misses for memory write operations within the third timeframe.

19. The dataflow computing device of claim 16, wherein the memory access metadata represents latency of the memory access operations, and wherein the controller is further configured to dynamically calculate an overlap value based on the latency metadata, the overlap value defining an intermediate phase between the read phase and the write phase, wherein staging elements dedicated to ports having a pending memory read operation and staging elements dedicated to ports having a pending memory write operation are configured not to block those operations during the intermediate phase.

20. A system for managing access to a memory device, the system comprising:

a host computing device configured to provide software instructions; and a dataflow computing device connected to the host computing device, the dataflow computing device comprising:

a plurality of clusters of interconnected Processing Elements (PEs), adapted to handle computing threads based on the software instructions received from the host computing device;

a clock configured to maintain a globally synchronized memory access cycle, comprising a read phase and a write phase, wherein at least one PE cluster implements:

one or more ports configured to perform memory access operations on the memory device; and one or more staging elements, each dedicated to a corresponding port and configured to control execution of memory access operations by that port based on a current phase of the memory access cycle.

* * * * *